(12) United States Patent
Duguay

(10) Patent No.: US 6,993,224 B1
(45) Date of Patent: Jan. 31, 2006

(54) SEGMENTED WAVEGUIDE ARRAY GRATINGS (SWAG)-BASED ARCHIVAL OPTICAL MEMORY

(75) Inventor: Michel A. Duguay, Ste-Foy (CA)

(73) Assignee: Université Laval, Québec (CA)

( * ) Notice: Subject to any disclaimer, the term of this patent is extended or adjusted under 35 U.S.C. 154(b) by 335 days.

(21) Appl. No.: 10/294,915

(22) Filed: Nov. 15, 2002

Related U.S. Application Data

(60) Provisional application No. 60/331,390, filed on Nov. 15, 2001, provisional application No. 60/331,389, filed on Nov. 15, 2001.

(51) Int. Cl.
G02B 6/26 (2006.01)
(52) U.S. Cl. ......................................... 385/39; 385/129
(58) Field of Classification Search .................... 385/1, 385/10, 31, 37, 39, 129–132; 359/572, 575
See application file for complete search history.

(56) References Cited

U.S. PATENT DOCUMENTS

| | | |
|---|---|---|
| 3,529,205 A | 9/1970 | Miller |
| 3,970,959 A | 7/1976 | Wang et al. |
| 4,687,286 A | 8/1987 | Winful |
| 4,725,110 A | 2/1988 | Glenn et al. |
| 4,807,950 A | 2/1989 | Glenn et al. |
| 4,859,013 A | 8/1989 | Schmitt et al. |
| 4,914,665 A | 4/1990 | Sorin |
| 5,276,748 A | 1/1994 | Magel |
| 5,278,926 A | 1/1994 | Doussiere |
| 5,285,274 A * | 2/1994 | Tanno et al. ................. 385/129 |
| 5,333,216 A | 7/1994 | Hitoshi et al. |
| 5,400,422 A | 3/1995 | Askins et al. |
| 5,502,779 A | 3/1996 | Magel |
| 5,526,450 A | 6/1996 | Kester et al. |
| 5,641,956 A | 6/1997 | Vengsarkar et al. |
| 5,771,250 A * | 6/1998 | Shigehara et al. ............. 372/6 |
| 5,796,891 A | 8/1998 | Poustie et al. |
| 5,818,988 A | 10/1998 | Modavis |
| 5,822,479 A | 10/1998 | Napier et al. |

(Continued)

FOREIGN PATENT DOCUMENTS

EP 0 761 616 A 3/1997

(Continued)

OTHER PUBLICATIONS

Wong V V et al., "Ridge-Waveguide Sidewall-Grating Distributed Feedback Structures Fabricated By X-Ray Lithography", Journal of Vacuum Science and Technology, Part B, American Institute of Physics, NY, vol. 11, No. 6, Nov. 1, 1993.

(Continued)

*Primary Examiner*—John D. Lee
*Assistant Examiner*—Sarah U Song
(74) *Attorney, Agent, or Firm*—Ogilvy Renault, LLP; Isabelle Chabot

(57) ABSTRACT

An archival waveguide memory device is provided and comprises a large number of elongated waveguides and a series of partially reflective elements distributed within each of the waveguides in accordance with data to be stored within the waveguides so as to act upon an input optical signal in each one of the waveguides and to generate a reflected output optical signal able to be uniquely correlated with the data. A method of recording data in a waveguide is also provided. A method of retrieving data stored in a waveguide is further provided and comprises injecting a pulsed optical signal in the waveguide, detecting a reflected output optical signal from the waveguide, and decoding a temporal variation in the reflected output optical signal to retrieve the data.

11 Claims, 11 Drawing Sheets

U.S. PATENT DOCUMENTS

| | | | |
|---|---|---|---|
| 5,903,683 | A | 5/1999 | Lowry |
| 6,021,242 | A | 2/2000 | Harumoto et al. |
| 6,047,096 | A | 4/2000 | Augustsson |
| 6,058,226 | A | 5/2000 | Starodubov |
| 6,067,391 | A | 5/2000 | Land |
| 6,214,495 | B1 | 4/2001 | Segawa et al. |
| 6,269,205 | B1 | 7/2001 | Peral et al. |
| 6,310,995 | B1 | 10/2001 | Saini et al. |
| 6,317,539 | B1 * | 11/2001 | Loh et al. .................... 385/37 |
| 6,654,532 | B1 * | 11/2003 | Tomaru et al. ............. 385/129 |
| 2001/0031114 | A1 | 10/2001 | Kashyap |
| 2001/0051020 | A1 | 12/2001 | Kashyap |
| 2001/0051021 | A1 | 12/2001 | Gaylord et al. |
| 2002/0015549 | A1 | 2/2002 | Pan et al. |

FOREIGN PATENT DOCUMENTS

| | | |
|---|---|---|
| EP | 0 810 454 A | 12/1997 |
| GB | 2 174 212 | 10/1986 |
| WO | WO 99 42899 A | 8/1999 |
| WO | WO 01 11401 A | 2/2001 |

OTHER PUBLICATIONS

Gong J. et al., "Analysing Distributed Feedback Waveguides", IEE Proceedings: Optoelectronics, Institution of Electrical Engineers, Stevenage, GB, vol. 146, No. 6, Dec. 14, 1999.

Livingston et al., "Planar Diffraction Grating for Board-Level WDM Applications", Proceedings of MPPOI 1996, pp. 77-84, Institute of Electrical and Electronics Engineers, Inc.

Mossberg, "Lithographic Holography in Planar Waveguides", Nov. 2001, vol. 12, No. 2, SPIE's International Technical Group Newsletter.

Cohn et al., "Nanolithography Considerations for Multi-Passband Grating Filters" Optical Review, vol. 6, No. 4 (1999), pp. 345-354, Japan.

Murphy, "Design, Fabrication and Measurement of Integrated Bragg Grating Optical Filters", (slides presented at thesis defense available from Internet at http://nanoweb.mit.edu/users/tern/phdthesis) Feb. 2001, Massachusetts Institute of Technology.

Murphy et al., "Design of Integrated Bragg Grating-Based Filters for Optical Communications", NanoStructures Laboratory Annual Report 2000, Massachusetts Institute of Technology, Apr. 19, 2000.

Murphy et al., "Design of Integrated Bragg Grating-Based Filters for Optical Communications", NanoStructures Laboratory Annual Report 2001, Massachusetts Institute of Technology, Aug. 1, 2001.

* cited by examiner

SEGMENTED WAVEGUIDE ARRAY GRATINGS (SWAG)-BASED ARCHIVAL OPTICAL MEMORY

CROSS-REFERENCE TO RELATED APPLICATIONS

The application claims priority on US provisional patent application Ser. No. 60/331,390 as U.S. provisional patent application Ser. No. 60/331,389 both filed Nov. 15, 2001 by Applicant. This application is further related to published PCT patent application for SEGMENTED WAVEGUIDE ARRAY GRATING FILTERS, publication No. WO 03/042737 published on May 22, 2003 by Applicant and to U.S. patent application for SEGMENTED WAVEGUIDE ARRAY GRATING FILTERS, application Ser. No. 10/494,040 published as application no. 2004-0258358 on Dec. 23, 2004 by Applicant, all of which are hereby incorporated by reference.

FIELD OF THE INVENTION

The invention relates to an optical memory. More specifically, it relates to a segmented waveguide array gratings (SWAG-) based memory.

BACKGROUND OF THE INVENTION

Modern society has come to depend in an essential manner on valuable information stored in archives, hopefully securely. The physical security level of the traditional medium, paper, is however very low. Wear and tear, water, fire and chemical agents present in the air can destroy paper on a short time scale. With the birth of the computer age, two new means have been introduced for archival storage. One is the magnetic recording, the second one is the optical disk.

The security level of magnetic recording is lower than that of paper: valuable information can be erased in little time by mistake, mischief, malice, or unfortunate decisions. In addition a variety of physical causes can destroy magnetically recorded information. These include mechanical failures of the read-out equipment (e.g. head crashes), spontaneous magnetic domain reversals, heat, fire, and stray magnetic fields, including those produced by high-power electromagnetic pulses from lightning or hostile man-made devices.

The second widespread archival medium is the optical disk, i.e. the ubiquitous compact disk called "CD" for music and CD-ROM for data, and the increasingly popular dense video disk or "DVD". The optical disk's physical security level is moderately high. Provided the disk is not exposed to excessive heat or light (e.g. direct sunlight), and provided the surfaces are protected from excessive scratching, the stored information can be guaranteed for a lifetime, in the 10- to 30-year range. That still leaves fire and excessive heat as potential agents undermining the physical security of current optical disks.

The need for ever larger data storage capacities has led the optical disk industry towards increasing both the surface density of information carrying pits and the number of layers hosting these information pits. The industry has progressed from the compact disk storing 650 MB on one 86-cm² layer (or 7.5 MB/cm²), to the latest four-layer DVD which can store 17 GB over the same 86-cm² area of access to information. For the four-layer DVD this represents an access density of 0.2 GB/cm².

Despite the impressive storage capacity of the latest DVD, the construction of large Petabyte-range archives, would require tens to hundreds of thousands of disks, and its operation would necessitate the use of cumbersome jukebox-type retrieval mechanisms for rapid remote access. Such mechanical handling of large numbers of disks would diminish the security and reliability of the archival memory.

In the on-going effort towards increasing the access density of information, the optical disk industry has gone from one layer in the CD, to two and four layers in the DVD, and towards even more layers in research carried out in a number of laboratories.

SUMMARY OF THE INVENTION

Accordingly, an object of the present invention is to provide a reliable archive memory.

According to a broad aspect of the present invention, there is provided an archival waveguide memory device comprising: a large number of elongated waveguides; and a series of partially reflective elements distributed within each of the waveguides in accordance with data to be stored within the waveguides so as to act upon an input optical signal in each one of the waveguides and to generate a reflected output optical signal able to be uniquely correlated with the data.

According to another broad aspect of the present invention, there is provided a method of recording data in a waveguide comprising: providing a waveguide; and creating a series of segments in the waveguide having predetermined effective indices of refraction ($n_{eff}$) with a distribution within the waveguide to act upon an input optical signal in the waveguide to generate a reflected output optical signal, the series being determined according to data to be stored in the waveguide.

According to a further aspect of the present invention, there is provided a method of retrieving data stored in a waveguide having a series of segments with predetermined effective indices of refraction ($n_{eff}$) with a distribution within the waveguide to provide a reflection of an optical signal in the waveguide, the series being determined according to the data stored in the waveguide, the method comprising: injecting a pulsed optical signal in the waveguide; detecting a reflected output optical signal from the waveguide; and decoding a temporal variation in the reflected output optical signal to retrieve the data in one or many bandwidth length.

According to another broad aspect of the present archival optical memory, bits of information are structurally stored inside bulk glass in the form of a matrix of segmented waveguide array gratings. Following the injection of an ultrashort laser pulse into one of the Swag (Segmented Waveguide Array Grating) waveguides, the information bits can be read out by means of pure time domain and/or spectrally resolved time domain reflectometry. Using glass as the preferred embodiment, the information could be stored reliably for millions of years.

Throughout the present specification, the segmented waveguide array gratings will be referred to by the acronym and word "Swag".

BRIEF DESCRIPTION OF THE DRAWINGS

These and other features, aspects and advantages of the present invention will become better understood with regard to the following description and accompanying drawings wherein:

FIG. 10 shows a memory layer for an alternative approach and geometry for the archival optical memory where complex Swag structures are built in.

DETAILED DESCRIPTION OF THE PREFERRED EMBODIMENT

A new approach to optical archival storage which features thousands of information-carrying layers and which could therefore increase dramatically the access density of information is described herein. The proposed optical archival memory is a matrix of segmented optical waveguides, where each 10-micron long segment constitutes the core of an optical waveguide and stores a bit of information by virtue of its diameter being either "thin", i.e. 0.9 micron, or "thick", i.e. 1.1 microns in the example presented below (see FIG. 1). Pure time domain and spectrally resolved time domain reflectometry are used to read out the bits (see FIGS. 2–9).

Figure 1:
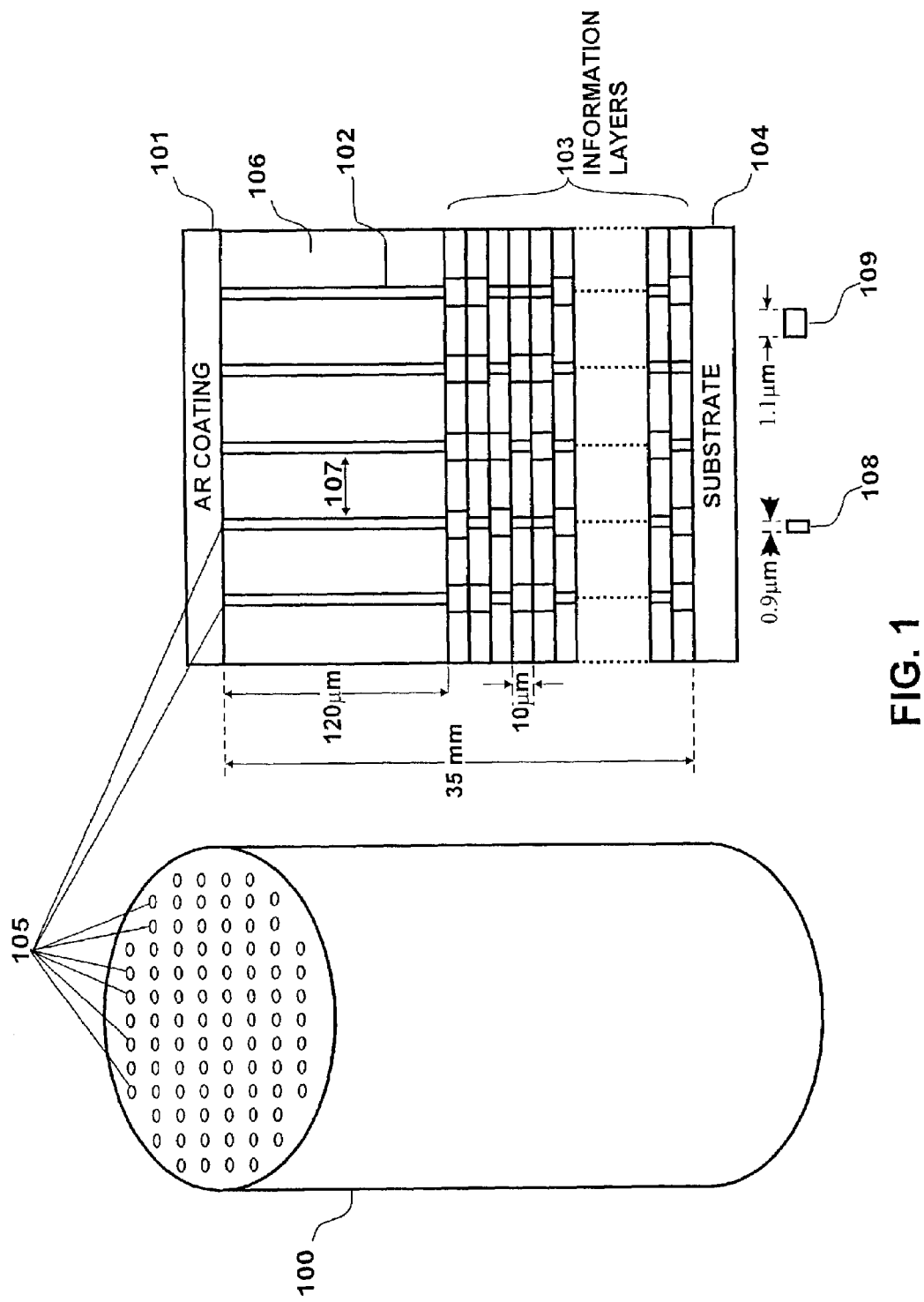
FIG. 1 shows the proposed optical archival memory as a matrix of segmented optical waveguides.

In the example presented in FIG. 1 the segment cores are made of aluminosilicate which has a refractive index of 1.6. The surrounding silica, which has a refractive index of 1.444 at 1550 nm, constitutes the cladding of the segmented waveguides. The matrix of segmented waveguides can take the form of a thick optical disk or of a thick block of glass. Although glass is the preferred material to be employed, it is clear that other materials, notably crystalline silicon, could be used to implement the same idea. If silicon, which has a refractive index of nearly 3.42 at 1550 nm, were used for the core of the segmented waveguides, either silica or air could serve as the cladding. In this case the very large "delta-n", i.e. the very large difference in core and cladding refractive indexes would result in very thin cores and it would allow waveguide separations on the order of one micron.

Figure 2:
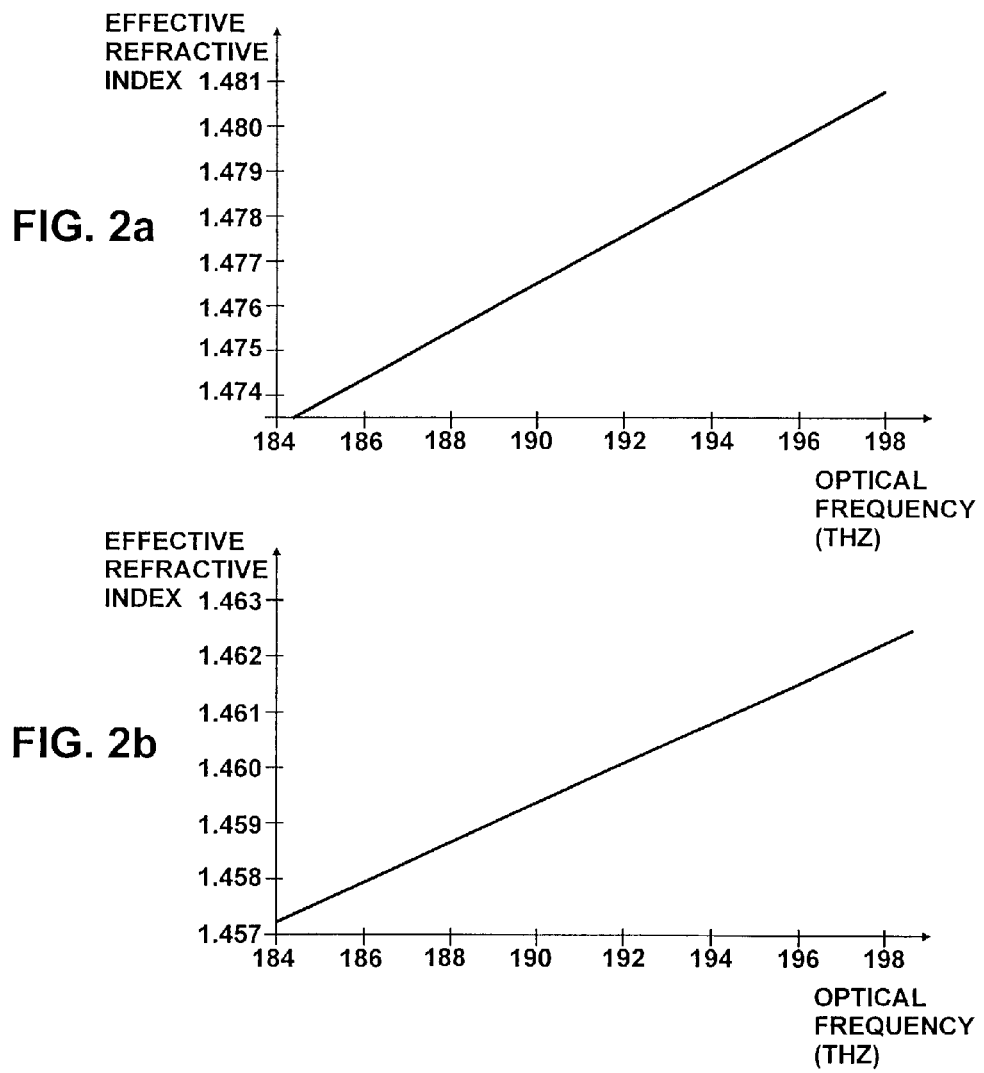
FIG. 2a illustrates a plot of $n_{eff}$ versus optical frequency for a 1.1-micron aluminosilicate core diameter imbedded in silica
FIG. 2*b* illustrates a plot of $n_{eff}$ versus optical frequency for a 0.9-micron aluminosilicate core diameter imbedded in silica.
Figure 5:
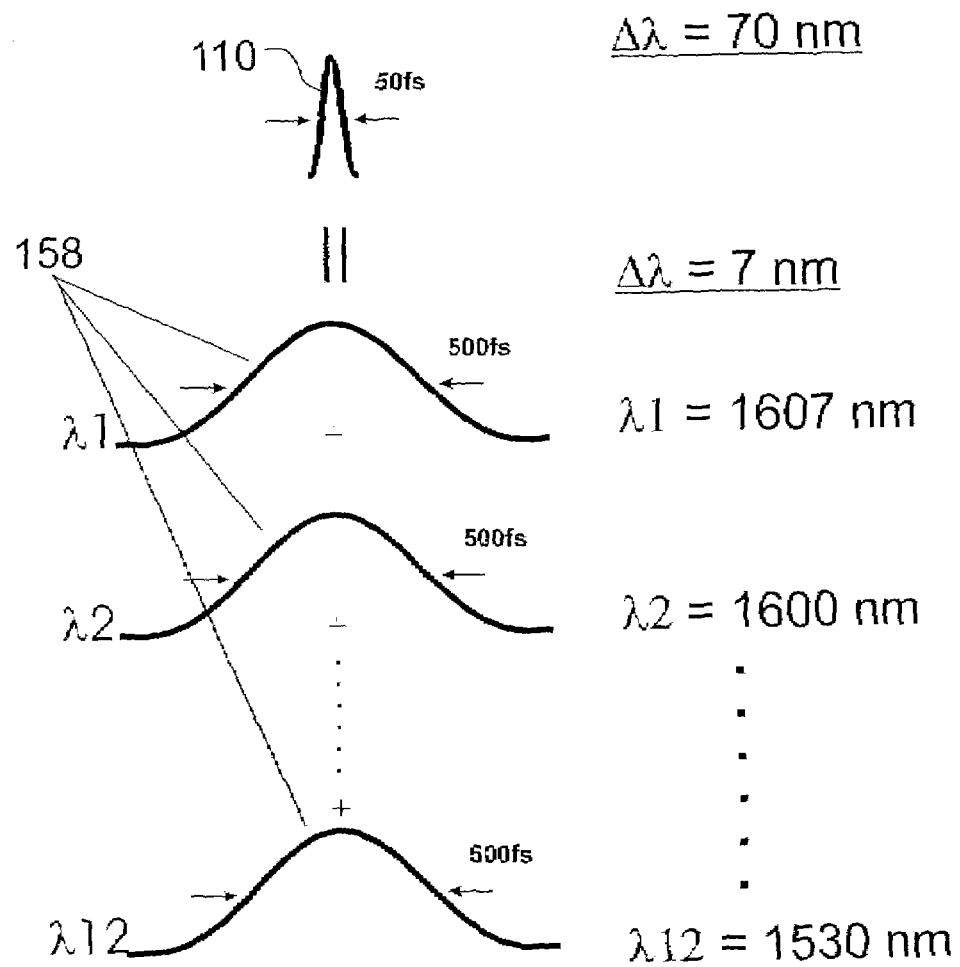
FIG. 5 shows that a light pulse can be described in first approximation as the superposition of 12 Fourier-transform limited pulses.

When constructed in the form of a thick optical disk, the information can be read out by mechanical and opto-electronic means, some aspects of which are similar to those in use with current optical disks (see FIGS. 2 and 5).

An example of the parameters that are proposed is the following: read-out carried out with light at wavelengths in the 1520–1610 nm band; a 3500- to 17000-layer optical disk incorporating segmented waveguides forming a matrix on 4.4-micron distant centers;

glass layers in the 2–10 micron thickness range making up a disk of 3.5 cm total thickness. In this case the surface density of access to stored information would be in the range 2–10 GB/cm$^2$, i.e. 10 to 50 times more than with 4-surface DVDs. A 3.5-cm thick optical disk of 86-cm$^2$ access area would store 170–850 GB of information. The surface density of access to stored information for the Swag-based archival memory should be 10 to 100 times more than for current two-surface optical disks.

The Swag-based archival optical memory thus presents two fundamental advantages:

1—the stored information is protected inside bulk glass from all the above-mentioned agents;

2—the very large surface density of access to information significantly reduces the number of disks required for an archive and would thus make it economically feasible for each disk, or each group of adjacent disks, to permanently have its own reading head, thereby avoiding cumbersome juke-box-type retrieval mechanisms and therefore allowing short access times.

Both of these features would lead to an archival memory presenting a high degree of physical security, reliability and unlimited readability.

In order to facilitate the description of the Swag-based optical archival memory, two specific examples will be used: the thick optical glass disk and the glass block. It will be clear to those skilled in the art that many variations of the basic design are possible.

1. The Thick Optical Disk

The thick optical disk 100 form of the archival optical memory will first be described. The example chosen is shown in FIG. 1. The 3.5-cm thick optical disk 100 is made up of some 3500 layers of glass 103, each one of which is 10 microns thick and structurally stores binary information in the form of "thin" (binary "0") 108 and "thick" (binary "1") 109 cylindrical segments (or micro-columns) of higher index glass, for example aluminosilicate, embedded in the surrounding glass. With an index of refraction of approximately 1.6 the aluminosilicate columns 105 constitute the cores of segmented optical waveguides capable of transmitting light vertically down through the optical disk. The silica 106 in which the columns are imbedded has a refractive index of 1.444 at 1550 nm and it constitutes the cladding of the segmented waveguides. The thin 108 and thick 109 column diameters are chosen so that the segmented waveguide 105 operates in the single mode regime for light in the 1520–1620 nanometer band with a propagating mode diameter which is very close to the minimum value. For the example considered below this minimum beam diameter is close to 1.2 micron (full width at half maximum amplitude for the electric field profile in the transverse direction) and it occurs when the aluminosilicate core 105 has a diameter close to 1.0 micron. Consider the case where thin micro-columns 108 have a diameter of 0.9 micron, while thick micro-columns 109 have a diameter of 1.1 microns. The mode diameter for these two core diameter values is very nearly the same and is close to 1.25 microns. In the example given above the waveguide core separation 107 was quoted as 4.4 microns center to center. The coupling that occurs between waveguides 105 imposes a minimum separation. The coupling is diminished when waveguides 105 are dissimilar, which would be the case here since the waveguides 105 are made up of different sequences of thin 108 and thick 109 segments. To combat the coupling the waveguide separation 107 might have to be increased beyond 4.4 microns. Another way to combat coupling is to specify slightly different core diameters on alternate waveguides in the 2-D matrix.

The top surface of the disk 100 is covered by an antireflection (AR) coating layer 101 which also provides protection for the glass disk 100. Underneath the AR coating 101 a first thin segment 120 microns in length 102 serves as a buffer zone to separate distinctly in time the reflections from the AR coating 101 and the first reflecting interface 120 in FIG. 4.

The substrate 104 is an optically flat silica glass disk upon which the stack of layers 103, the layer containing the buffer waveguides 102 and 101 are formed through deposition or other techniques.

As light propagates down the segmented waveguide, a reflection occurs at each interface that lies between a thin 108 and a thick 109 segment. As shown in FIG. 2 this is due to the fact that the effective refractive index $n_{eff}$ of the fundamental mode propagating down the waveguide changes abruptly (i.e. in less than one tenth of the wavelength of the read-out light pulse) in going from a thin 108 to a thick 109 segment. FIG. 2a illustrates a plot of $n_{eff}$ versus optical frequency for a 1.1-micron aluminosilicate core diameter 108 imbedded in silica and FIG. 2b illustrates a plot of $n_{eff}$ versus optical frequency for a 0.9-micron aluminosilicate core diameter 109 imbedded in silica. This discontinuity reflects light back into the waveguide, which is desired, but it also scatters (or couples) a small amount of light into radiative modes, which is not desired but which can be coped with. The loss caused by this scattering can be minimized by designing the thin 108 and thick 109 diameters of the waveguide segment cores (the micro-columns) to be smaller and larger, respectively, than the core diameter giving the minimum mode diameter, in such a way that the mode diameter is substantially the same in the thin 108 and thick 109 segments. This way the mismatch in going from a thin 108 to a thick 109 waveguide segment (and vice versa) will result in a substantial reflection coefficient, as desired, while minimizing the coupling to radiative modes, the undesired loss mechanism.

At a wavelength of 1550 nm the single interface reflectivity coefficient for the electric field amplitude in going from a thin 108 to a thick 109 segment is given by EQ. 1:

$$r = [n_{eff}(\text{thick}) - n_{eff}(\text{thin})] / [n_{eff}(\text{thick}) + n_{eff}(\text{thin})] \quad \text{(EQ. 1)}$$

This field amplitude reflection coefficient r has a value close to $0.60 \times 10^{-2}$ for the case when light goes from a 0.9-micron thin segment 108 into a 1.1-micron thick segment 109 of aluminosilicate embedded in silica. The power (or light intensity) reflection coefficient for a single interface is $r^2$ and is on the order of $0.36 \times 10^{-4}$. Note that the sign of r in EQ. 1 becomes negative when the light goes from a thick to a thin segment. A thin-to-thick transition will be referred to below as an "up-transition" with positive r, and to a thick-to-thin transition as a "down-transition" with r negative.

Because r is small, in the discussions that follow regarding the light signals reflected back by the segmented waveguides 105, the phenomenon of multiple reflections can be safely ignored. Compared to the directly reflected field amplitude, the three-times reflected light signal (which also comes back towards the input end) is down in strength by several orders of magnitude and it has therefore a negligible effect on the measured reflected light signal.

The attenuation suffered during propagation by the input read-out light and by the reflected light signal could be compensated for to a certain extent by doping the aluminosilicate core with erbium, and by optically pumping it. In other wavelength ranges other optically amplifying elements could also be used, like praseodymium for instance in the 1300 nm band.

Reading out the Information

As in the conventional optical disk, laser light is brought in from above and focused onto the disk's surface in such a way that the light is coupled with very high efficiency into a given segmented waveguide 105. The incident read-out light is in the form of ultrashort pulses 110 which are either 50 or 500 fs and which are spaced 400 ps in time in the present example featuring a 3.5-cm thick optical disk 100. Each incident ultrashort light pulse 110 gives rise to a great many reflected pulses originating at the numerous interfaces between thin 108 and thick 109 waveguide segments (see FIG. 1). By temporally and spectrally analyzing this light one can recover the precise sequence of binary 0s (thin micro-columns 108) and 1s (thick micro-columns 109) structurally stored in the glass. What follows is a discussion of the read-out techniques.

a) Read-out by Time Domain Reflectometry.

Figure 3:
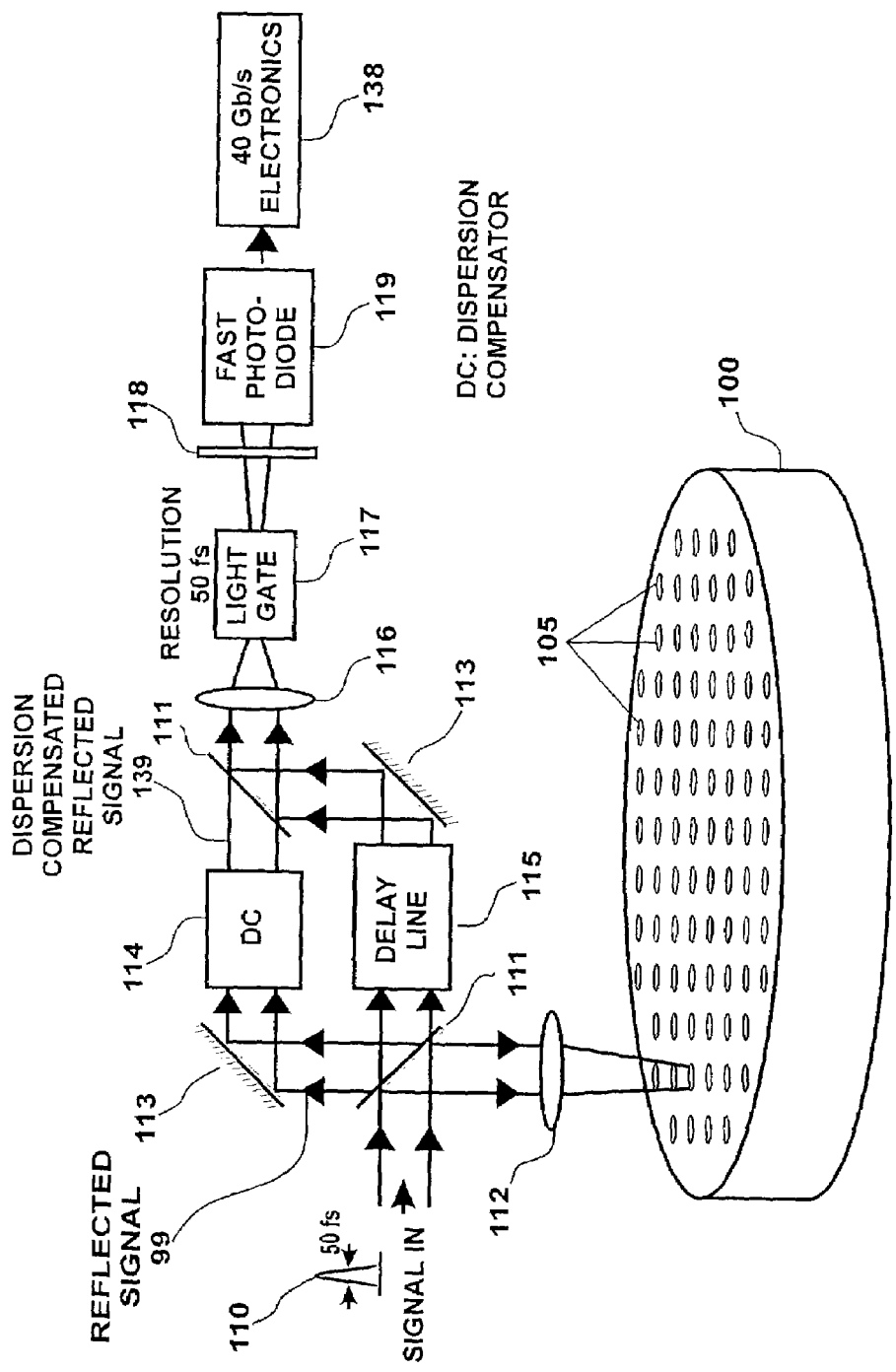
FIG. 3 provides a schematic diagram for a device for reading-out the information by time domain reflectometry.
Figure 4:
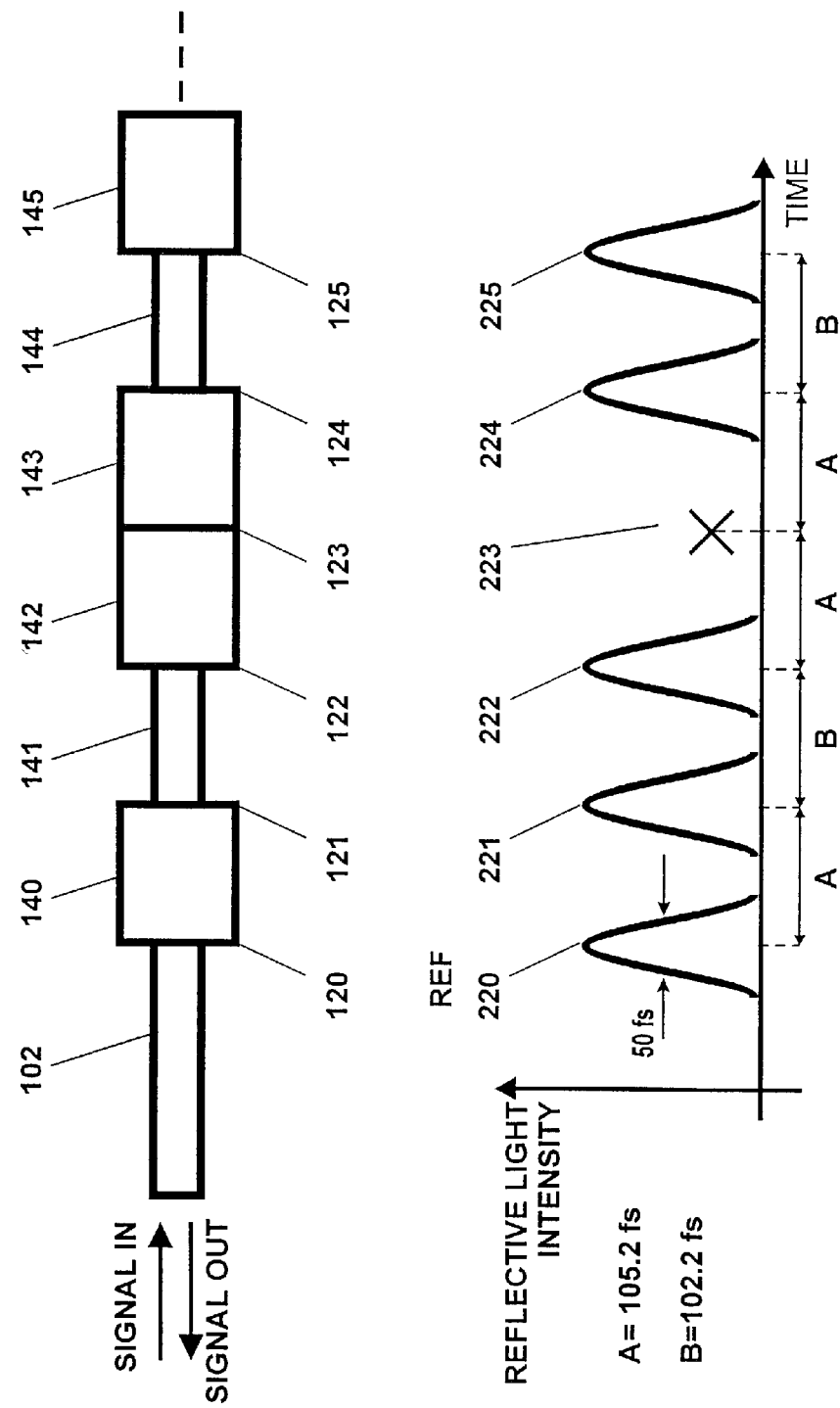
FIG. 4 presents an example of a segmented waveguide with its interfaces and the reflective light pulses that come from this waveguide.

The conceptually easiest way to read out the information in the present example is shown in FIGS. 3 and 4. One injects into a segmented waveguide 105 a 50-femtosecond pulse 110 from a laser such as a mode-locked erbium-doped fiber laser. The numerous interfaces between thin and thick segments in the segmented waveguide reflect a series of ultrashort light pulses back towards the input face of the disk. For interfaces sandwiching a thin 10-micron segment as is the case for interfaces 121 and 122 illustrated in FIG. 4, the two reflections 221 and 222 are spaced in time by about 102.2 fs at 1550 nm. For interfaces sandwiching a thick 10-micron segment as is the case for interfaces 120 and 121 illustrated in FIG. 4, the two reflections 220 and 221 are spaced in time by about 105.2 fs at 1550 nm. For the first layers in the optical disk 100 the reflected light echoes are thus well resolved in time and can be measured by a sampling technique using a suitably fast light gate 117.

With 50-fs read-out pulses 110 however, dispersion is large and must in general be compensated for. The initially 50-fs pulse 110 spreads out as it propagates along a segmented waveguide so that the interface reflections from the deepest layers in the disk 100 have been broadened out to about 2 or 3 ps (depending on the thin/thick segment sequence) as they exit the entrance surface. This leads to a considerable temporal overlap of the light pulses reflected from various interfaces, thereby greatly increasing the difficulty of identifying the thin-to-thick segment transitions.

To counter this pulse-broadening effect a variable dispersion compensator 114 in FIG. 3 can be used to recompress the reflected pulses to nearly their original 50-fs duration. This dispersion compensator 114 would be adjusted according to the depth of the layers 103 that one wishes to read out. Alternatively, one could use several reading heads for the disk, each head incorporating a fixed dispersion compensator 114 meant for a certain range of layer depths in the optical disk 100.

With the proper dispersion compensation in place the sequence of reflected light echoes looks like the one shown in FIG. 4. Each light pulse reveals a transition from a thin to a thick segment or from a thick to a thin segment. (In FIG. 4 segments 102, 141 and 144 are thin, the others are thick). The absence of a pulse 223 signifies no change in segment diameter as at the reflecting interface 123.

For every segmented waveguide 105 in FIG. 1 the first reflecting interface is an up-transition from the thin input waveguide 102 to a thick 10-micron long segment 140 in FIG. 4. This positive reflection serves as a fixed temporal reference pulse 220 for reading out the information contained in the reflections from the stack of 3500 layers 103 shown in FIG. 1. Each one of 3500 information-carrying layers 103 is 10 microns in the light propagation direction in this first example.

An alternative way of implementing time domain reflectometry as a way of reading out the stored information would be to use pre-chirped laser pulses, a technique known in optical communications to combat the effect of dispersion. Here the incident read-out laser pulse 110 would be pre-chirped and of longer duration so that the optical carrier frequency decreases with time (down-chirp). The amount of chirp would be adjusted according to the depth of the reflecting interfaces that one wishes to read out and according to the dispersion encountered in the bit sequence of segments preceding it. Upon exiting the disk 100, the reflected pulse 99 will have been recompressed by the waveguide's dispersion to a duration of about 50 fs, thus allowing it to be temporally distinguished from adjacent reflected pulses.

In the following, assume that the effect of dispersion has been reduced to a negligible level for the layers of interest through dispersion compensation or by choosing a waveguide core diameter and a read-out wavelength for which dispersion is very small. In the example given here read-out wavelengths that are deeper into the infrared (i.e. wavelengths longer than 1600 nm) will give rise to less dispersion because the chromatic dispersion due to the glass material will counter to a certain extent the waveguide dispersion, just as occurs nowadays in dispersion shifted fibers for optical communications in the 1550-nm band.

The light signal reflected from the 3.5-cm thick stack of 3500 layers 103 extends over a time duration which is slightly under 375 ps in the 1500–1600 nm band. In order to measure the time profile of the reflected light 99 with 50-fs resolution one can use an ultrafast light gate 117 driven by a gating light pulse which is a portion of the input 50-fs read-out pulse 110 and which is transmitted by beamsplitter 111. This gating light pulse goes through the variable optical delay line 115 shown in FIG. 3 and then enters the ultrafast light gate 117. The value of the delay D is being ramped up at the rate of 50 fs in 400 ps, i.e. 25 ps in 200 nanoseconds. The ultrafast light gate 117, where light is used to control light, could be one using optical frequency up-conversion in nonlinear crystals. In this case the 50-fs gating pulse interacts in the nonlinear crystal with the light signal to be read out and it converts a large fraction of its energy into second harmonic light in the 750–800 nm deep red portion of the spectrum. Filter 118 ensures that only some frequency light enters the photodiode.

The 50-fs sample of deep red light is then detected by a fast photodiode 119 which puts out a 5-ps electronic pulse whose amplitude is proportional to the energy in the 50-fs sample of deep red light. State-of-the-art electronics similar to what is now used for 40 GB/s optical communications 138 can then digitize the amplitudes of these 5-ps pulses which are coming out at a rate very close to once every 25 ps. At this rate 15 samples can be extracted from the 375-ps reflected light signal in one sampling round. This sampling is sparse so that a total of 25 ps/0.05 ps=500 sampling rounds will be necessary in order to completely sample the signal.

The complete sampling of the reflected light signal will be achieved thanks to the ramping up of the optical delay line 115. With the delay line 115 set for an initial delay of $D_0$ in FIG. 1, in the first sampling round the signal is sampled at times $t_0$, $t_0+25.003$ ps, $t_0+50.006$ ps, $t_0+75.009$ ps, $t_0+100.012$ ps, ..., $t_0+375.047$ ps. The 3 fs (or 0.003 ps) adding up at each step is due to the ramping up of delay D.

The second sampling round begins 400 ps later when the read-out laser sends in another 50-fs pulse 110. This time the delay line has $D=D_0+50$ fs, so that the sampling times are now: $t_0+50$ fs, $t_0+50$ fs+25.003 ps, $t_0+50$ fs+50.006 ps, $t_0+50$ fs+75.009 ps, $t_0+50$ fs+100.012 ps, ..., $t_0+50$ fs+375.047 ps.

The 500 sampling rounds take a total time of 500×0.4 ns=200 ns. Let us assume that the rotational speed of the disk 100 is on the order of 0.5 m/s=0.5 nm/ns. Then in 200 ns the read-out light beam focus will move by 100 nm=0.1 micron in the transverse direction. With the timing chosen so that the read-out beam will be precisely centered on one of the segmented waveguides 105 during the 250th sampling round, the largest offset from perfect alignment will be 50 nm. Since the input beam spot size will be about 1.2 micron (or 0.85 micron diameter in terms of power density), this slight offset will affect only slightly the level of power injected into and collected from the segmented waveguide 105 being read out, and it can therefore be tolerated.

With 3500 bits read out in 200 nanoseconds the instantaneous reading rate is 17 GB/s. Since it will take another 8.8 microseconds for the reading head to come over the next segmented waveguide which is 4.4 microns away from its neighbor, the average bit read-out rate is therefore $3500/(8.8\times10^{-6})=398$ Mb/s. This read-out rate can of course be further increased through the use of multiple read-out heads.

b) Read-out Through Time and Spectral Domain Reflectometry.

When one carries out purely time domain reflectometry as described above, the instantaneous rate at which information-bearing light pulses are being reflected is almost 10 Tb/s. This extremely high rate is currently the maximum bit rate achieved in field trials of state-of-the-art optical communications systems. In these trials several hundred wavelengths are used simultaneously so that the bit rate on each individual channel operating on an assigned wavelength is limited to 10, 20 or 40 GB/s. One crucial advantage of coding information in many channels, each having a limited bandwidth (usually under 80 GHz in optical frequency), is that it makes it possible to cope adequately with fiber optic dispersion by almost completely eliminating its deleterious effect with the help of dispersion compensators.

Similar multiwavelength tactics can also be employed here in reading out the archival optical memory in order to minimize the pulse dispersion problem and to ease therefore the task of measuring the time profile of the reflected light signals. The basic idea explained in FIG. 5 is that an incident 50-fs pulse 110, whose spectral width is 70 nm at half maximum spectral power density, can be thought of, in first approximation, as being equivalent to a superposition of 12 Fourier-transform limited pulses 158, each 500 fs in duration and 7 nm in width at half maximum spectral power density, the 12 spectral peaks being spread out in 7-nm increments over the 1530–1610 nm band. Accurate measurements of the reflected light over the 375-ps time domain for each one of the spectral components will in principle yield most of the information that the 50-fs pure time domain reflectometry, with dispersion compensation, would have yielded. Each one of the 500-fs pulses 158 has 10 times less spectral width so that temporal dispersion is about 200 fs for the deepest layers, thereby lengthening the corresponding reflected pulses to 540 fs, a tolerable amount.

Figure 6:
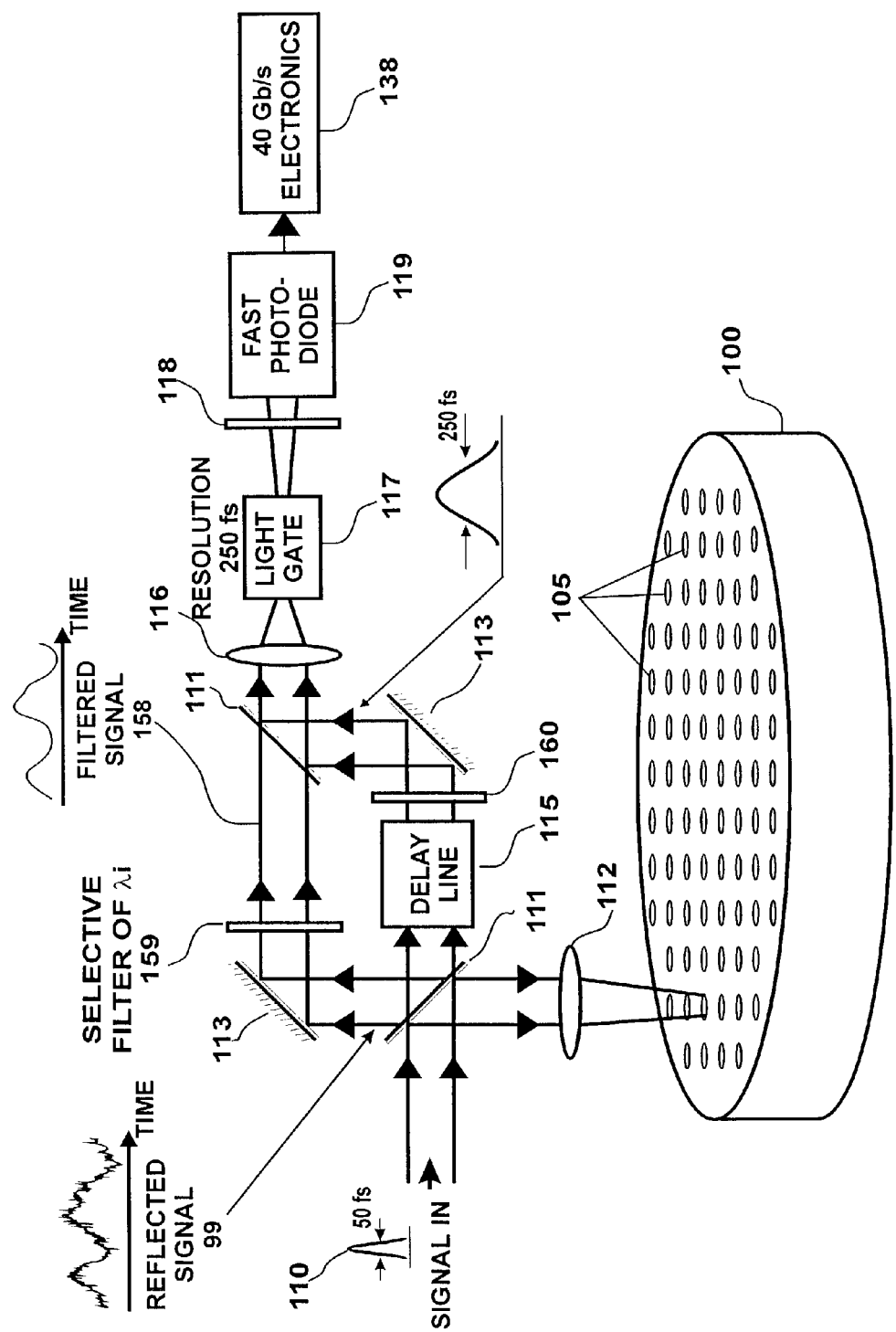
FIG. 6 depicts a read-out device for reading through time and spectral domain reflectometry.
Figure 7:
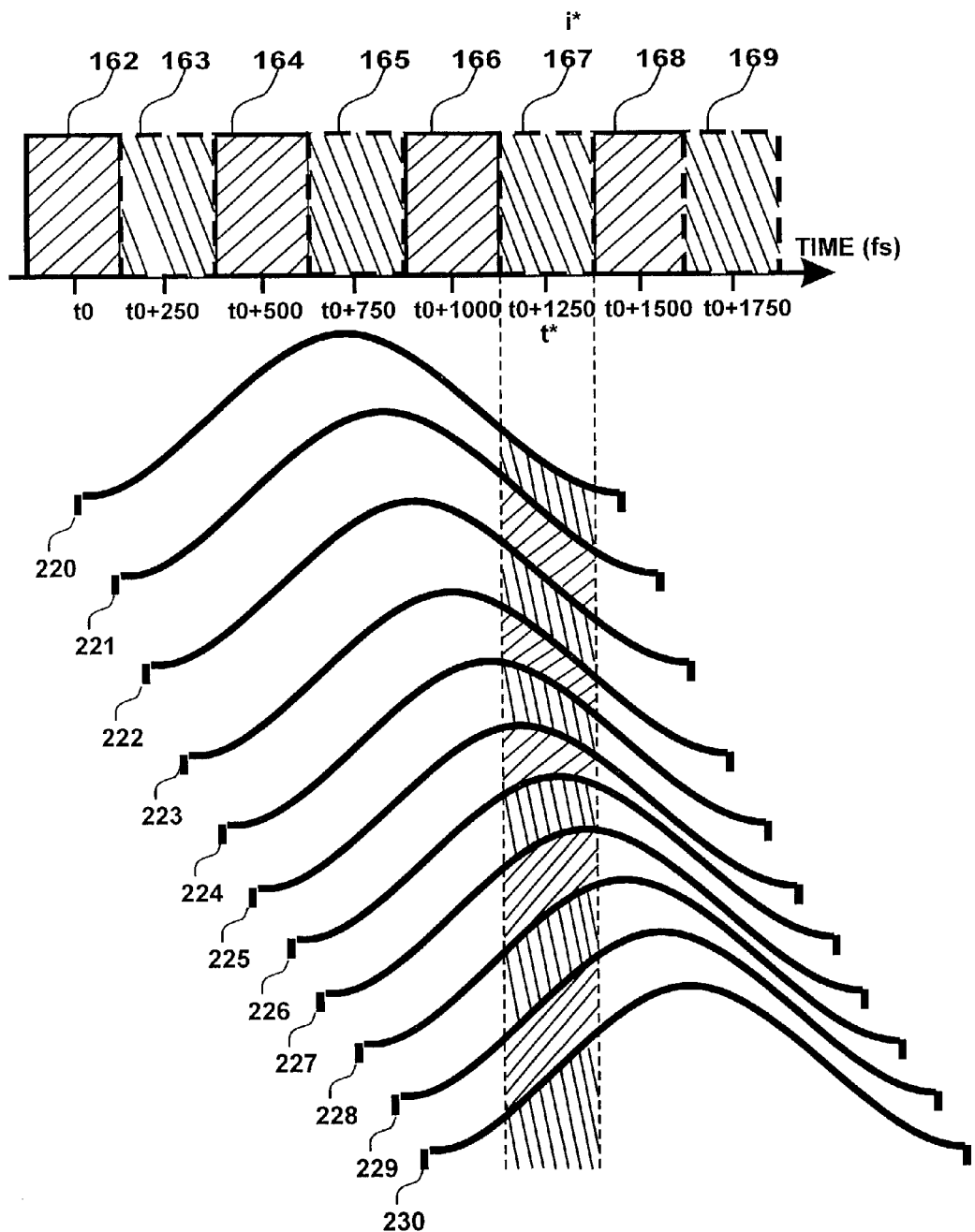
FIG. 7 explains the contribution of interfaces for each sampling window.

One implementation of this idea for reading out the information stored in the segmented waveguide is illustrated in FIG. 6. The same 50-fs laser pulse 110 as earlier is used as an input to the memory through beamsplitter 111. The 12 Fourier-transform equivalent read-out pulses are spectrally Fourier-transform limited Gaussian-shaped pulses which have a duration of 0.500 ps (or 500 fs) at half maximum instantaneous power. The latter is taken to be the square of the optical electric field averaged over one optical period. With a Gaussian time profile for the light pulse, its spectrum is also Gaussian-shaped and has a spectral width $\Delta f=0.88$ THz at half maximum spectral power density, which translates to $\Delta\lambda=7$ nm in terms of wavelength in the 1520–1610 nm band. One must note that the corresponding electric field amplitude envelope for the 0.5-ps light pulse is 0.707 ps at half maximum amplitude. On the return side electro-optically adjustable wavelength selective filter 159 lets only light in the appropriate 7-nm wide sub-band go through to the sampling gate.

A interference filter 160 in FIG. 6 is designed to lengthen the 50-fs pulse into a 250-fs pulse that will be used for driving the sampling light gate, which again could be used on optical sum-frequency generation in a nonlinear crystal. Since the reflected light pulses from individual interfaces in the segmented waveguide are 500 fs in duration, or slightly more, the 250-fs time resolution will be sufficient in FIG. 6.

Figure 8:
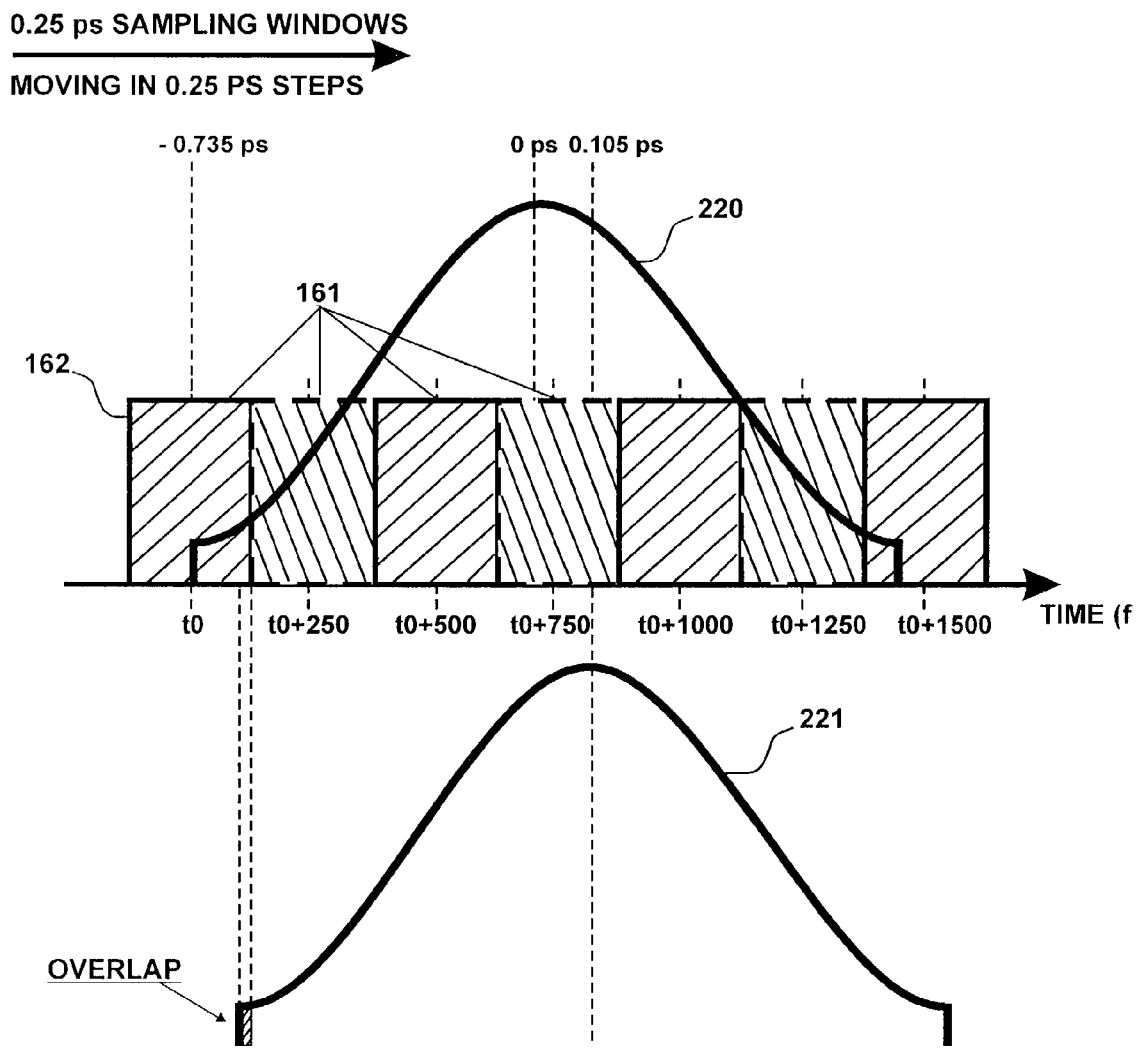
FIG. 8 illustrates the "peel-off" method for analyzing read-out signal by examining the situation for the first sampling.

As mentioned earlier the envelope of the optical electric field of the 500-fs read-out pulses is 707 fs at half maximum amplitude, again assuming a Gaussian shape. For the purpose of simplifying the discussion here below it is assumed that this electric field envelope is essentially 1.47 ps at the base, i.e. the effect of its leading or trailing edges for times ahead or behind its peak by more than 0.735 ps will be neglected. FIG. 8 illustrates the idealized truncated pulse shape used for discussion purposes. In FIG. 8, the time origin is taken to be the time at which the peak of light pulse 220 reflected from interface 120 would arrive if it were completely alone. The least finite value retained for the electric field amplitude envelope is 0.05 (the peak's field amplitude is normalized to unity) occurring at 0.735 ps before and after the peak of the reflected pulse.

The round-trip delay between two interfaces sandwiching a segment is either 102.2 or 105.2 fs for thin 108 and thick 109 segments respectively. Solely for the purpose of simplifying the description of the read-out procedure and analysis here below, the round-trip delay will be taken to be 105 fs regardless of the segment's identity, be it a binary bit "0" or "1". It is understood that in practice the computer carrying out the analysis of the spectral/temporal data would take into account the precise actual delays which are segment-identity dependent. Note that the 0.05-amplitude points, which nominally terminate the electric field envelope of the light pulse at an interval of 0.735 ps from the peak, correspond to the delay between reflections originating from interfaces which are separated by 7 segments.

Filter 118 in FIG. 6 ensures that only the sum-frequency light (in the deep red) enters the fast photodiode. The reflected light signal 99 is sampled this time with a 250-fs window and with a period close to 25 ps as can be done with 40 GB/s electronics 138. The same sampling technique is used as was described above for the pure time domain reflectometry measurement. This time, with each sampling round the variable delay of the variable optical delay line 115 is increased by 250 fs instead of 50 fs above. The sampling rounds now number (25 ps)/(0.25 ps)=100 and they cover a total time interval of 40 ns. The time domain measurements are carried out for 500-fs read-out light pulses whose wavelengths are centered at 1530, 1537, 1544, 1551, 1558, 1565, 1572, 1579, 1586, 1593, 1600 and 1607 nm, all of which fall within the ranges of the C and L bands of erbium-based optical amplification.

Time domain measurements at each wavelength could be carried out sequentially with the one set-up shown in FIG. 6. After the 40-ns complete sampling interval the tunable filter 159 could be electro-optically tuned to a new wavelength within 10 ns, and a new complete sampling interval started again. Since the total 12-wavelength sampling would now take 12×50 ns=600 ns, the relative speed of the disk 100 and laser heads would need to be reduced to 0.16 m/s to keep the input light in focus long enough over the segmented waveguide 105.

This slow-down of the disk's speed can be avoided by another approach, which is to reproduce the set-up of FIG. 6 in each of 12 reading heads, each one having its tunable filter 159 set at one of the 12 wavelengths. These 12 reading heads would be positioned to focus read-out light along the same track on the disk 100. All data pertaining to one segmented waveguide 105 would be collated and analyzed by a fast computer. In this case the disk speed could be increased to 2.5 m/s since each one of the 12 laser heads would carry out the complete sampling in only 40 ns.

Let us now analyze the temporal/spectral data obtained from the complete sampling of the reflected light on 12 different wavelengths. When considering a sample i* at an arbitrary time t*, and at 12 wavelengths, as many as 16 or 17 truncated pulses overlap within the 250-fs sampling window 167 in FIG. 7. This can be seen in FIG. 7 by assuming, for instance, that a sampling window 167 coincides at time t* with the peak of a pulse reflected from interface i*. The leading edges of the potential reflections from the next 7 deeper interfaces will have a finite value at time t*. Note that 7×105 fs=735 fs, the time interval from the peak of the pulse to the truncated leading or lagging edge. The 250-fs duration of the sampling window 167 (assumed to have an ideal rectangular time profile) adds 125 fs to the sampling's reach in each sampling time direction, so that potentially 8 deeper interfaces can contribute to the field amplitude at time t* in addition to interface i*. The same applies to the lagging edges of light pulses potentially reflected from the shallower 8 interfaces. The result is that as many as 17 pulses can potentially add up to give the resulting electric field amplitude at time t*. When the center of the sampling window does not coincide with the peak of one of a reflected light pulses (taken alone) one can have that 16 interfaces can potentially contribute to the reflected signal sample at a given time t*.

When analyzing the data for time t* at the 12 wavelengths, it would be very time consuming to search among the $2^{16}$ or $2^{17}$=65 536 to 131 072 possible permutations of thin 108 and thick 109 segments in order to match the computed 12-point spectrum with the measured data. This would probably give ambiguous results in view of the limited precision of the sampling technique applied to a signal subject to quantum noise. A better approach to analyzing the data is to sort of "peel off" the thin/thick segment sequence starting at the beginning of the time profile, as explained here below.

First, the situation for the first sampling will be examined. Referring to FIG. 8, the temporal sampling window 162 will be idealized by a rectangular gate 250 fs in duration and precisely centered on the time $t_0=-735$ fs at which time the light gate receives the leading edge of light pulse 220, which is the reference pulse, i.e. the first reflection from the reference up-transition labeled 120 in FIG. 4. At this precise time the leading edge of pulse 221 from the possible down-transition at interface 121 (there would not be any transition 121, nor any pulse 221, if segment 141 were thick) is partly captured by the late part of the first sampling window 162 from $t_0$+105 fs to $t_0$+125 fs. As the read-out wavelength changes from 1530 to 1607 the round-trip optical path length of the 10-micron long segment 102 changes by nearly one wave so that a possible down-transition 221 could be detected in the 12-point spectral profile. If present, pulse 221 will interfere constructively with pulse 220 (the reference pulse) at some wavelength $\lambda_c$ in this 77-nm wide range. At another wavelength, displaced by about 38 nm from $\lambda_c i$, the two pulses 220 and 221 will interfere destructively. This data can therefore begin to give an idea about segment 141 being thin (interference present) or thick (no reflection, no interference). But since the overlap of pulse 221 with the sampling window 161 is very short (20 fs), segment 141 might not be identified unambiguously at this point.

Figure 9:
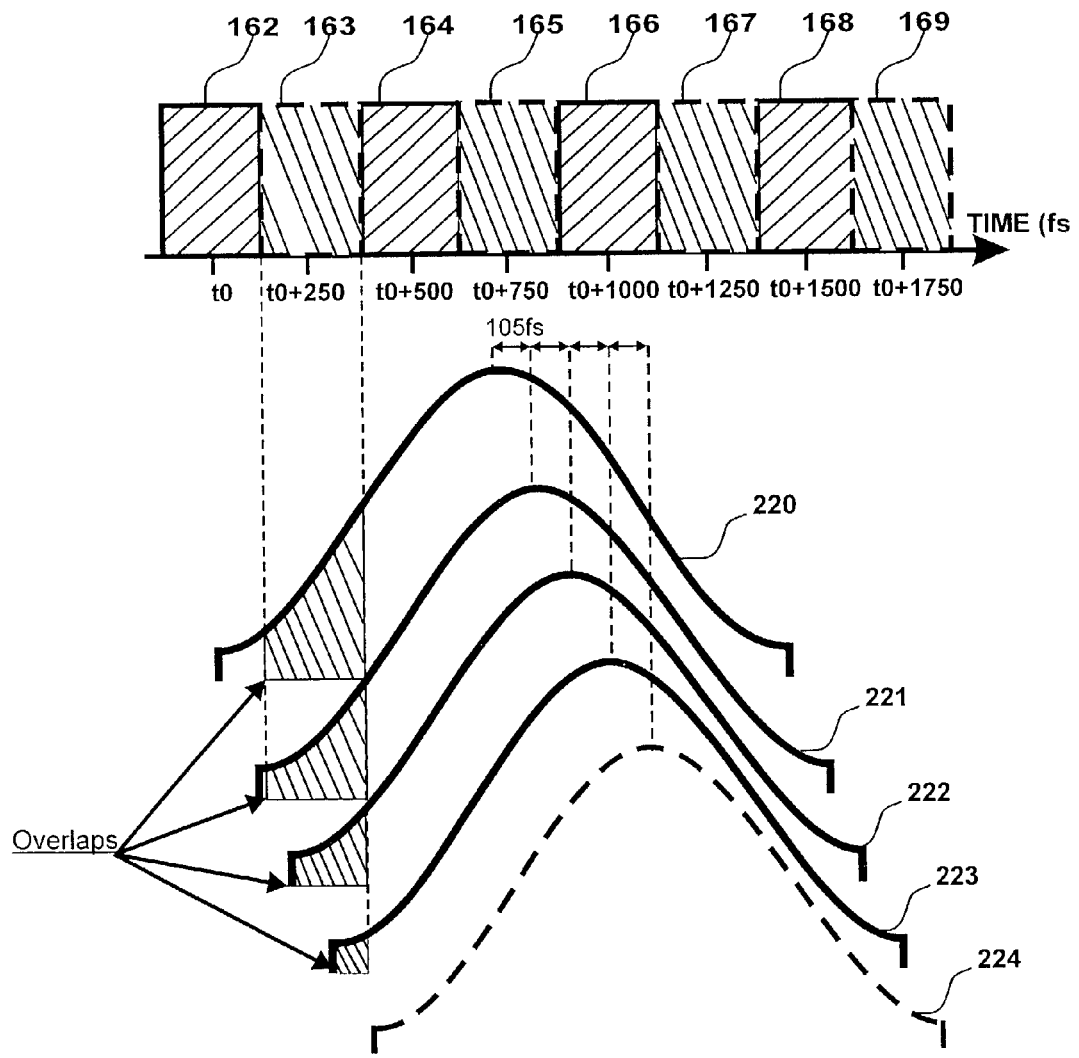
FIG. 9 illustrates the "peel-off" method for analyzing read-out signal by examining the situation for the second sampling.

Let us now examine the second sampling window 163 in FIG. 9 centered on time $t_0$+250 fs=−485 fs. It can be seen from FIG. 9 that two more pulses then come into play. Pulses 220, 221, 222, will contribute strongly to the coherent sum of the optical electric fields within the sampling window, with pulse 223 making a minor contribution. As the read-out wavelength varies from 1530 to 1607 nm, the round-trip optical path length difference between pulse 220 and pulses 221, 222 and 223 will change by very nearly, one, two, and three waves, respectively. This will make for a richly modulated 12-point spectrum, where each interface contributes to a different periodicity in the spectral profile and can thus be identified. Disregarding at this time the possible (but minor) contribution from segment 143, a computer can search to match this measured 12-point spectrum with the spectrum computationally obtained by coherently adding the contributions of pulses 220, 221 and 222 that the different permutations of segments 140 and 141 would give rise to. The number of possibilities is only $2^2$=4 (segment 140 is always 1), so that a good match can be found very quickly. It can be safely assumed that segments 140 and 141 can now be identified with certainty. The identity of segment 142 is left open at this point.

By the expression "coherently adding" it is meant adding phasors in the complex plane with the proper delays between pulses being taken into account. In other words, during the computational analysis, one adds up sinusoids modulated by the 707-fs wide envelopes shown in FIG. 9, with due attention being paid to the delays, precise to a fraction of a femtosecond, between the pulses reflected by the various interfaces. The precise values of the parameters used by the computer program in modeling the measured spectra can be obtained ahead of time by measuring the complete spectral/ temporal profiles produced by known segment sequences using the actual read-out heads used in the archival memory. It is assumed that the light-gating sampling technique, be it by optical up-conversion or by some form of opto-electronic sampling, measures the amplitude of the total electric field envelope of the reflected light.

When considering the third sampling window 164 centered at $t_0$+500 fs=−235 fs, the following pulses will add up coherently at various times and make a major contribution to the resulting sample amplitude: 220, 221, 222, 223. Pulse 224 will make a minor contribution. With the sequence now known for segments 140, 141 and 142 the computer search can disregard the contributions from segment 143 and restrict its search to a set of $2^2$=4 possibilities for segments 141 and 142. The identities of segment 143 can be left open.

Examining now the fourth sampling window 165 centered at $t_0$ +750 fs=15 fs, pulses 220, 221, 222, 223, 224, 225, 226 and 227 now make a major contribution, while pulse 228 makes a minor contribution. The computer now has the sequence of segments 140, 141, 142, 143 and 144 in hand, so that searching for the identity of segments 145, 146, 147 (the contribution of segment 148 being ignored at this point) is carried out within a set of $2^3$=8 permutations of ones and zeros. Given the strength of pulses 225, 226 and 227 in the sampling window 165, the computer's data fitting to the 12-point spectrum in this sampling window 165 will identify segments 145, 146 and 147 with a high degree of confidence.

When considering the fifth sampling window 166 centered at $t_0$+1.0 ps=265 fs. Pulses 220, 221, 222, 223, 224, 225, 226, 227, 228 and 229 will make the dominant contribution, while pulse 230 will make a minor contribution at this time. The computer has in memory the segment sequence from 140 to 147, and now searches among a set of 4 permutations for the identities of segments 148 and 149, the contribution of pulse 230 being neglected and the identity of segment 150 being left open.

Considering the sixth sampling window 167 centered at $t_0$+1.25 ps. Pulses 220, 221, 222, 223, 224, 225, 226, 227, 228, 229, 230 and 231 will make the dominant contribution, while pulses 232 and 233 will make a minor contribution at this time. The computer has in memory the segment sequence from 140 to 149, and now searches among a set of 4 permutations for the identities of segments 150 and 151, the identities of segments 152 and 153 being left open.

Considering the seventh sampling window 168 centered at $t_0$+1.5 ps. Pulses 222, 223, 224, 225, 226, 227, 228, 229, 230, 231, 232, 233 and 234 will make the dominant contribution, while pulses 220, 221, and 235 will make a minor contribution at this time. The computer has in memory the segment sequence from 140 to 151, and now searches among a set of 8 permutations for the identities of segments 152, 153 and 154, the identity of segment 155 being left open.

Considering the eighth sampling window 169 centered at $t_0$+1.75=1.015 ps. Pulses 224, 225, 226, 227, 228, 229, 230, 231, 232, 233, 234, 235 and 236 will make the dominant contribution, while pulses 222, 223, and 237 will make a minor contribution at this time. The computer has in memory the segment sequence from 140 to 154, and now searches among a set of 4 permutations for the identities of segments 155, and 156, the identity of segment 157 being left open.

With the eighth sampling window 169 centered at 1.015 ps, the reflected pulses 220 and 221 have dropped out. At this time 16 interface reflections are potentially contributing to the observed amplitude of the total reflected electric field envelope.

As one goes into deeper layers with sampling time, upper layer reflections keep disappearing from view as new ones come up from the deeper layers. The fact that there are never more than 17 layers contributing to the reflected light, and moreover that only 2 or 3 new layers appear effectively at each sampling step, makes the read-out problem highly tractable through computational fitting of the measured spectral/temporal data with the calculated time profiles at all 12 wavelengths for the assumed segment sequence.

Various schemes are possible to ease the data reading. One could encode 25-bit data blocks into a sub-set of a 28-bit sequences for instance, taking advantage of the additional bits to eliminate some sequences that might be difficult to read out unambiguously. Also, following every 100 layers, a sequence of 4 thin segments 108 followed by a thick segment 109 could be used in the analysis to verify that the read-out procedure is not in error and to produce a reflected pulse 99 from the up-transition to restore a precise timing reference.

Fabrication

The thick optical disk 100 could be fabricated layer by layer by using modern chemical vapor deposition techniques followed by modern methods of nanofabrication. Following the deposition of an aluminosilicate layer, a planarization step (through chemical mechanical polishing for example) could take place, followed by the spinning of photoresist. A rastered laser beam with electro-optic control over its focused spot size could then print a thin/thick hole pattern in the photoresist. After developing and baking the photoresist, a reactive ion etching machine would transfer the information into arrays of thin 108 and thick 109 aluminosilicate cylindrical segments, or micro-columns. The silica cladding layer 106 can then be deposited, followed again by a planarizing step that would stop at the tops of the minicolumns. Other ways of accomplishing the same goal are within the capabilities of modern nanofabrication technology. For mass production of encyclopedias for instance, masks could be used as in standard chip manufacturing.

2. The Optical Memory Block

Figure 10:
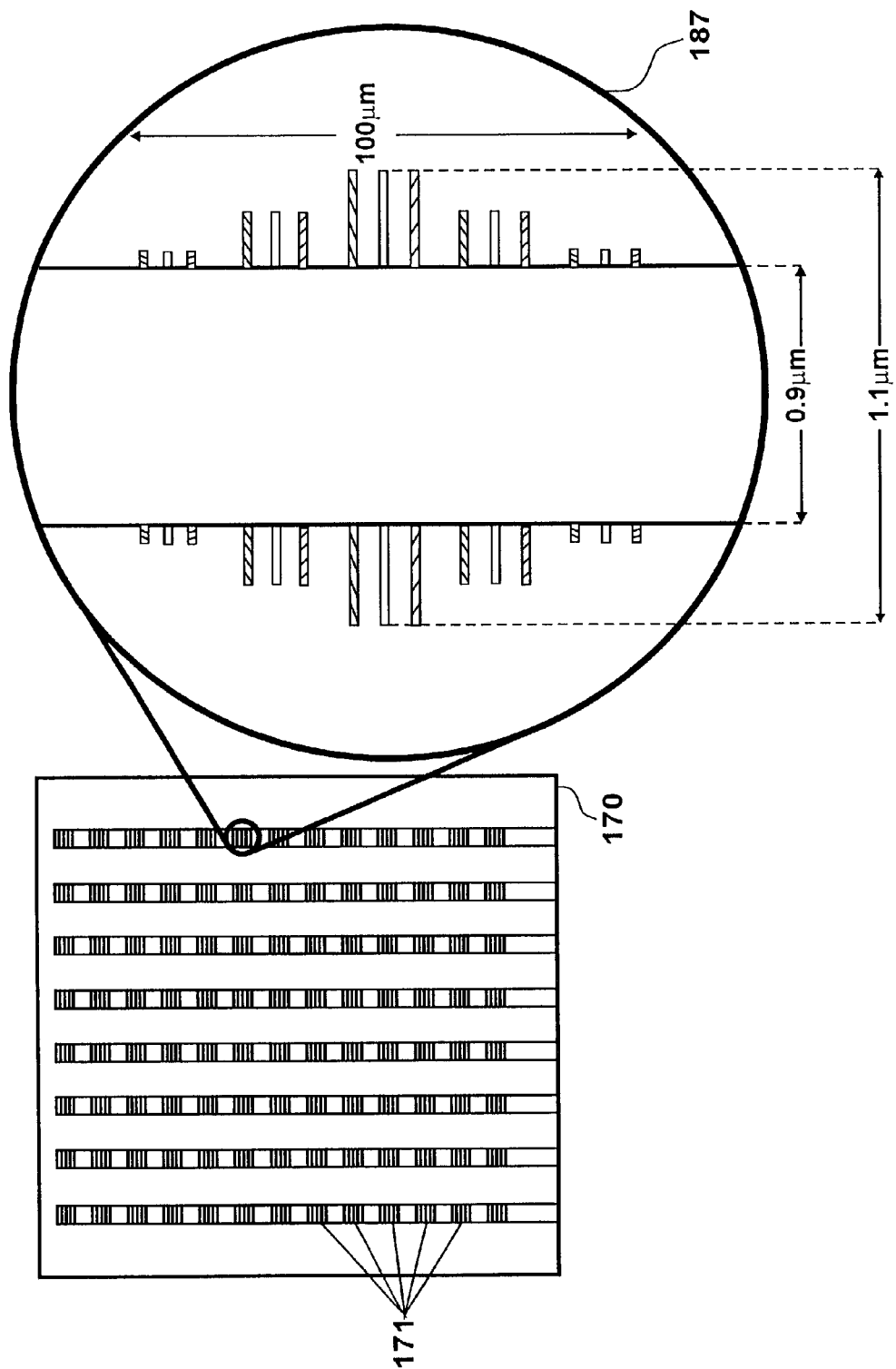
Figure 11:
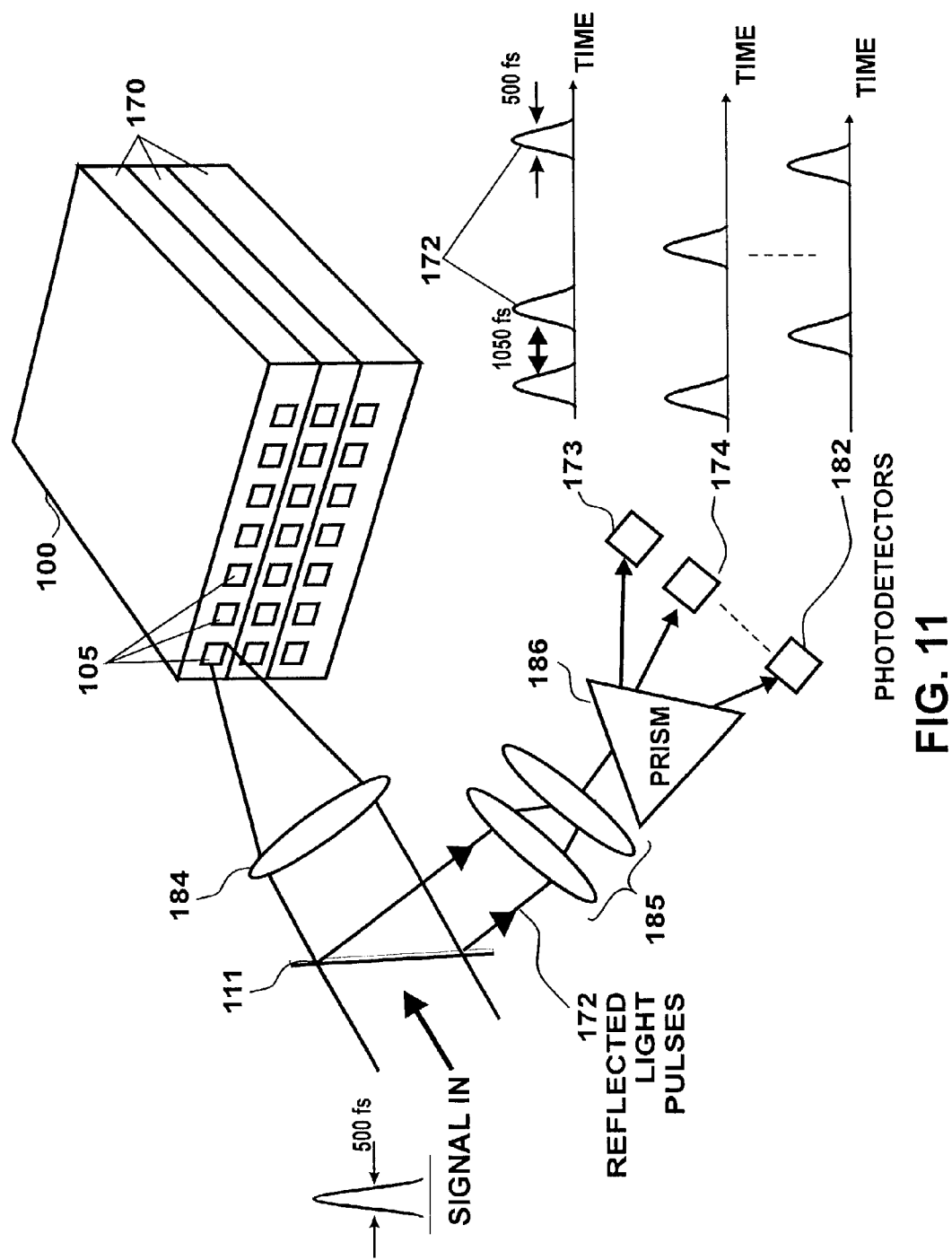
FIG. 11 depicts the optical memory block and its read-out device.

FIGS. 10 and 11 illustrate an alternative approach and geometry for the archival optical memory. Here nanolithography is used to fabricate layers 170 where complex Swag structures 171 are built in. An example is described below where the manufacturing would require great complexity and precision, but where the read-out would be greatly simplified.

With the Swag technology it is possible to produce gratings which are sparse and which can therefore be interleaved in a straightforward fashion with highly predictable properties. In the alternative approach a bit "1" for read-out at wavelength $\lambda_i$ is represented by a quarter-wave stub Swag minigrating 171 designed to reflect light within a given sub-band of wavelengths centered at $\lambda_i$, where i can run from 1 to 10, for example. A bit "0" at this read-out wavelength $\lambda_i$, and at one of the positions on 100-micron centers, is represented by the absence of a Swag minigrating at that position. In FIG. 10 the quarter-wave stub Swag minigratings 171 occupy 100 microns in length along the z axis and they are set 100 microns apart when they stand for two adjacent binary 1s. In FIG. 10 three Swag minigratings are interleaved in order to encode three binary "1" bits for read-out at each of three wavelengths.

A tunable laser producing a 500-fs pulse is used for read-out (see FIG. 11). The read-out pulses are passed through a 50—50 beamsplitter 111 and focused by lens 184 into one of the segmented waveguides. The reflected pulses 172 are about 1.05 ps apart. They could be sampled as described above. More than 10 Swag gratings 171 can be interleaved so that 10 different sequences of bits can be read out at each of 10 different wavelengths. The interleaving must be done in the way prescribed in the Swag provisional patent application, where the positioning of a given segment interface at position z* requires taking into precise numerical account all the segments that read-out light will have encountered by the time it reaches the interface at z*.

A big advantage of the simple quarter-wave Swag minigrating approach is that a read-out pulse at wavelength $\lambda 7$ for example, will suffer very little reflection loss from minigratings 171 made for the other wavelengths $\lambda_1$ to $\lambda_6$ and $\lambda_8$ to $\lambda_{10}$. In addition the optical power at 980 nm and/or 1480 nm which could be used to pump the erbium doped aluminosilicate glass core, would be very little attenuated by the multiple gratings made for reflection within the erbium amplification band.

With this reduced loss at a given read-out wavelength, and with fairly uniform optical amplification over long lengths of segmented waveguides 105, the latter could be made 35 cm long instead of 3.5 cm in the thick optical disk 100 above. This would lead to a tenfold increase in capacity per $cm^2$ of access area. The Swag minigratings 171 are ten times longer than the 10-micron layers in the thick optical disk 100, but with the tenfold interleaving the linear bit density along the light propagation axis z remains the same as in the disk. The tenfold increase in waveguide length leads to a tenfold increase in total capacity, to 1.7 TB per 86-$cm^2$ access area, equivalent to 100 DVDs of 17 GB capacity. This increased waveguide length would necessitate the use of dispersion compensators to compensate for the longer path lengths.

Instead of using a tunable laser for producing the 500-fs read-out pulse, one could use ultrashort pulses 50-fs in duration as earlier described for read-out. Ten different bit streams on the ten different wavelengths mentioned earlier would emerge, would be reflected by beamsplitter 111 and would be collimated by lenses 185 into a prism (or diffraction grating) spectrometer arrangement 186 in FIG. 11. The reflected light signal would be measured and recorded simultaneously on all ten wavelengths by means of ten photonic (e.g. optical sum-frequency generation in a nonlinear crystal) or optoelectronic sampling gates and accompanying electronics 173 to 182 in FIG. 11. The sampling techniques described above would be applied in this case as well.

3. Combining Techniques

If a titanium-sapphire laser with a nearly 400-nm bandwidth were used, the temporal/spectral read-out technique described above could be combined with the 50-fs read-out technique in order to increase the storage capacity by going to thinner layers, possibly as thin as two microns or less. In other words, one would use the titanium-sapphire laser to produce 50-fs pulses on several wavelengths spanning its lasing range from 700 to 1100 nm. Dispersion compensation would have to be incorporated. Multiple reading heads with different heads compensated for various depths could be used to speed up the data gathering and analysis process. The larger capacity offered would justify the added read-out hardware. Total capacity might approach a level equivalent to 1000 DVDs for the same 86-$cm^2$ access area.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. An archival waveguide memory device comprising:
   a large number of elongated waveguides; and
   a series of segments having predetermined effective indices of refraction (neff) distributed within each of said waveguides in accordance with data to be stored within said waveguides so as to act upon an input optical signal in each one of said waveguides and to generate a reflected output optical signal able to be uniquely correlated with said data;

wherein said segments modify a transverse dimension of said elongated waveguide in abrupt steps, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum.

2. An archival waveguide memory device as claimed in claim 1, wherein each of said change in the waveguide transverse dimension is one of a thin and a thick transverse dimension of said elongated waveguides.

3. An archival waveguide memory device as claimed in claim 1, wherein said output optical signal is correlated with said data by time domain reflectometry.

4. An archival waveguide memory device as claimed in claim 1, wherein said output optical signal is correlated with said data by spectrally resolved time domain reflectometry.

5. An archival waveguide memory device as claimed in claim 1, wherein said waveguides are placed in an environment of glass.

6. An archival waveguide memory device as claimed in claim 2, wherein a core of said waveguide is made of aluminosilicate and a cladding of said waveguide is made of silica and wherein said thick dimension is 1.1 $\mu$m and said thin dimension is 0.9 $\mu$m.

7. A method of recording data in a waveguide comprising:
providing a waveguide; and
creating a series of partially reflective segments in said waveguide having predetermined effective indices of refraction (neff) with a distribution within said waveguide to act upon an input optical signal in said waveguide to generate a reflected output optical signal, said series being determined according to data to be stored in said waveguide;
wherein said creating comprises modifying a transverse dimension along said elongated waveguide in abrupt steps so as to create a long sequence of segments, said abrupt steps corresponding to a change in the wave guide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum.

8. A method as claimed in claim 7, wherein each of said change in the waveguide transverse dimension is one of a thin and a thick dimension of said waveguide.

9. A method of retrieving data stored in a waveguide having a transverse dimension modified in abrupt steps so as to create a long sequence of segments, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum, said series being determined according to said data stored in said waveguide, the method comprising:
injecting a pulsed optical signal in said waveguide;
detecting a reflected output optical signal from said waveguide; and
decoding a temporal variation in said reflected output optical signal to retrieve said data.

10. A method as claimed in claim 9, wherein said decoding is time domain reflectometry.

11. A method as claimed in claim 9, wherein said decoding is spectrally resolved time domain reflectometry.

* * * * *